(12) United States Patent
Berman

(10) Patent No.: US 8,438,091 B1
(45) Date of Patent: May 7, 2013

(54) TARGET DRIVEN SPENDING REDUCTION PLAN

(75) Inventor: Kristen K. Berman, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 543 days.

(21) Appl. No.: 12/433,166

(22) Filed: Apr. 30, 2009

(51) Int. Cl.
*G06Q 40/00* (2012.01)

(52) U.S. Cl.
USPC .............................. 705/36 R; 705/35; 705/40

(58) Field of Classification Search .................... 705/35, 705/36 R, 40
See application file for complete search history.

(56) References Cited

U.S. PATENT DOCUMENTS

| | | | | |
|---|---|---|---|---|
| 2004/0054610 A1* | 3/2004 | Amstutz et al. | ................. | 705/36 |
| 2006/0074788 A1* | 4/2006 | Grizack et al. | ................. | 705/35 |
| 2009/0281873 A1* | 11/2009 | Yaskin | ............................. | 705/10 |

OTHER PUBLICATIONS

May et al. Flexible budgeting and variance analysis in an activity-based costing environment. © 1994 American Accounting Association. Accounting Horizons vol. 8 No. 2. Jun. 1994 pp. 93-103.*

Swain et al. Activity-based costing and simulation modeling. The Journal of Bank Cost & Management Accounting; 1998; 11, 1; ProQuest Central p. 34.*

Leslie Kren. Using Activity-Based Management for Cost Control. Journal of Performance Management; 2008; 21, 2; ProQuest Central p. 18.*

* cited by examiner

*Primary Examiner* — Muriel Tinkler
(74) *Attorney, Agent, or Firm* — Osha Liang LLP

(57) ABSTRACT

A method for generating a spending reduction plan, includes obtaining a savings target that has a target amount and a target schedule, analyzing, using a processor of a computer system, a spending history for a plurality of spending categories to generate a historical spending pattern comprising a plurality of spending variances corresponding to the plurality of spending categories, identifying a first spending category of the plurality of spending categories by comparing the plurality of spending variances based on a pre-determined criterion, analyzing, using a processor of a computer system, a first historical savings pattern for the first spending category to determine a first reduction percentage, and generating the spending reduction plan based on the savings target, the first spending category, a first spending variance corresponding to the first spending category, and the first reduction percentage.

13 Claims, 4 Drawing Sheets

TARGET DRIVEN SPENDING REDUCTION PLAN

BACKGROUND

People have difficult time saving money for a large expenditure that they would like to make in the future. This is particularly true because the process of saving, much like dieting, involves a regular requirement that someone gives up a tangible benefit, in exchange for a future goal that remains purely theoretical until a later date.

Most consumers have regular expenditures that are not necessary to one's continued health and happiness. If consumers identify those categories of "excess," and track any spending reductions by category, a savings (i.e., spending reduction) plan may develop naturally. Limiting spending in particular categories often seems more manageable and reasonable for most consumers.

SUMMARY

In general, in one aspect, the invention relates to a method for generating a spending reduction plan, includes obtaining a savings target that has a target amount and a target schedule, analyzing, using a processor of a computer system, a spending history for a plurality of spending categories to generate a historical spending pattern comprising a plurality of spending variances corresponding to the plurality of spending categories, identifying a first spending category of the plurality of spending categories by comparing the plurality of spending variances based on a pre-determined criterion, analyzing, using a processor of a computer system, a first historical savings pattern for the first spending category to determine a first reduction percentage, and generating the spending reduction plan based on the savings target, the first spending category, a first spending variance corresponding to the first spending category, and the first reduction percentage.

In general, in one aspect, the invention relates to a computer readable medium storing instructions for executing on a processor to generate a spending reduction plan, the instructions comprising functionality for obtaining a savings target comprising a target amount and a target schedule, analyzing a spending history for a plurality of spending categories to generate a historical spending pattern comprising a plurality of spending variances corresponding to the plurality of spending categories, identifying a first spending category of the plurality of spending categories by comparing the plurality of spending variances based on a pre-determined criterion, analyzing a first historical savings pattern for the first spending category to determine a first reduction percentage, and generating the spending reduction plan based on the savings target, the first spending category, a first spending variance corresponding to the first spending category, and the first reduction percentage.

In general, in one aspect, the invention relates to a system for generating a spending reduction plan. The system includes a spending reduction plan generator executing on a processor and configured for obtaining a savings target comprising a target amount and a target schedule, identifying a spending category of a plurality of spending categories by comparing a plurality of spending variances corresponding to the plurality of spending categories based on a pre-determined criterion, generating the spending reduction plan based on the savings target, the spending category, a spending variance corresponding to the spending category, and a reduction percentage corresponding to the spending category. The spending reduction plan generator includes a spending pattern analyzer executing on the processor and configured for analyzing a spending history for the plurality of spending categories to generate a historical spending pattern comprising the plurality of spending variances corresponding to the plurality of spending categories, and a savings pattern analyzer executing on the processor and configured for analyzing a historical savings pattern for the spending category to determine the reduction percentage corresponding to the spending category. The system further includes a repository operatively connected to the spending reduction plan generator and configured for storing the savings target, the spending history comprising a plurality of spending record each comprising an amount, date, and category of the spending record, the historical spending pattern comprising a plurality of entries each comprising a variance, period, and category of the historical spending pattern entry, the historical savings pattern comprising a plurality of entries each comprising a planned reduction amount, actual reduction amount, and category of the historical savings pattern entry, and the spending reduction plan comprising one or more entries each comprising a periodic reduction amount, estimated amount, and category of the spending reduction plan entry.

Other aspects of the invention will be apparent from the following description and the appended claims.

DETAILED DESCRIPTION

Figure 1:
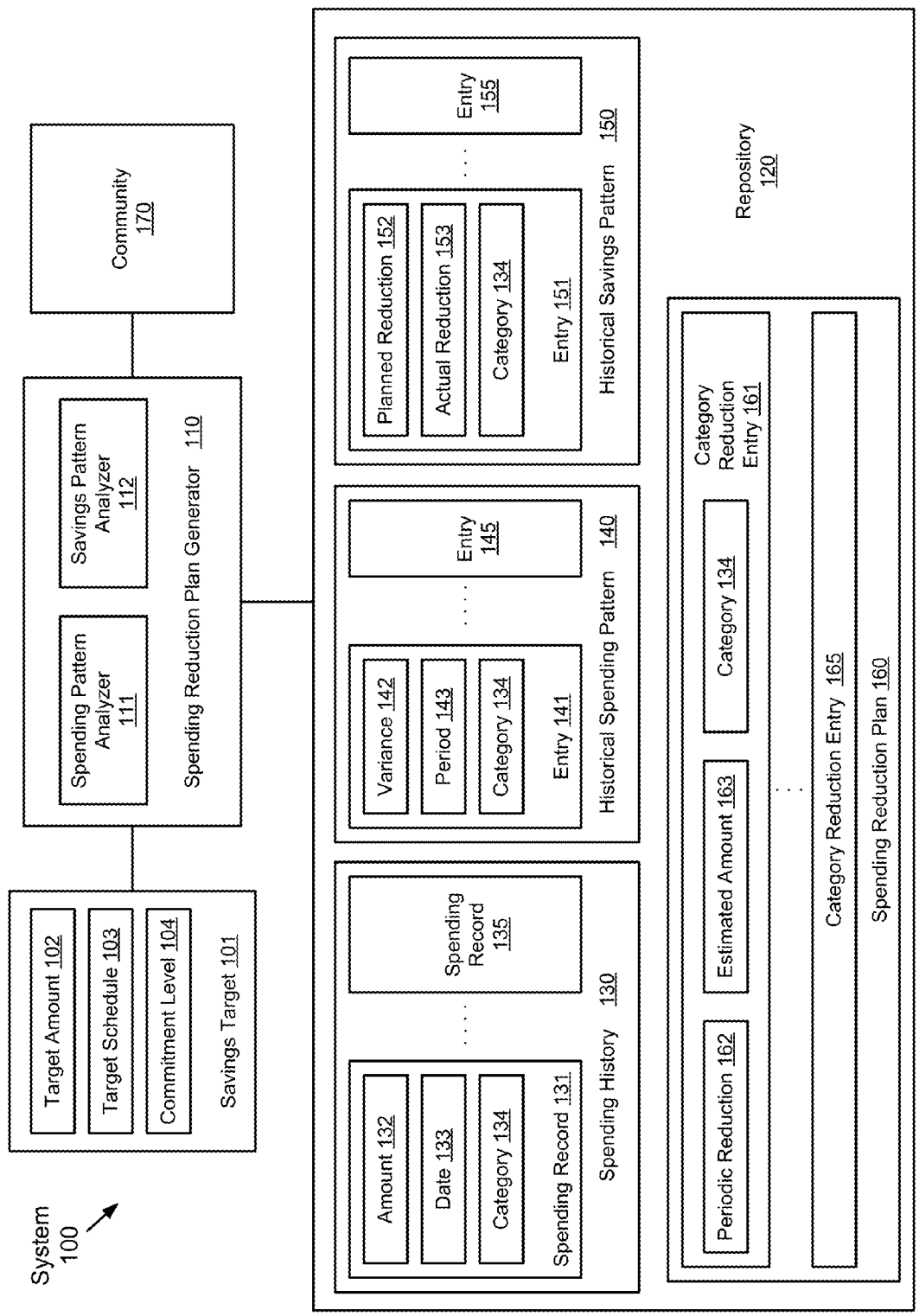
FIG. 1 depicts a block diagram of a system in accordance with one or more embodiments of the invention.

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to evaluate a savings target based on historical spending pattern. Furthermore, if the savings target is determined to be achievable, embodiments of the invention generate a spending reduction plan for reaching the savings target. In particular, embodiments of the invention generate the spending reduction plan considering variances in multiple spending categories of the spending history to identify potential reductions in discretionary spending to assist in saving toward the savings target. In addition, embodiments of the invention include consideration of prior savings success pattern in generating the spending reduction plan.

FIG. 1 depicts a block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes a savings target (101), a spending reduction plan generator (110), a repository (120), and a community (170). In one or more embodiments of the invention, the spending reduction plan generator (110) further includes a spending pattern analyzer (111) and a savings pattern analyzer (112) while the repository (120) stores various data used by the spending reduction plan generator (110), which includes a spending history (130), a historical spending pattern (140), a historical savings pattern (150), and a spending reduction plan (160).

Generally speaking, the savings target (101) may be related to planning for one or more certain future purchase(s) for which the savings is designated. In one or more embodiments of the invention, the savings target (101) may include a target amount (102) and a target schedule (103). For example, the target amount (102) may be related to the purchase price and the target schedule (103) may be related to the planned future purchase date. In one or more embodiments of the invention, the target amount (102) and the target schedule (103) are staged. In other words, the savings target (101) may include more than one stage, where each stage is associated with a partial amount having a corresponding time point (or milestone) leading to the target schedule (103). In one or more embodiments of the invention, the savings target (101) further includes a commitment level (104) relating to a level of commitment to achieve the savings target (104). For example, the commitment level (104) may be related to the level of individual's interest or desire (e.g., high, medium, low, strong, weak, heavy, light, etc.) to save toward the savings target (101). In another example, the savings target (101), the spending history (130), the historical spending pattern (140), or the historical savings pattern (150) may be related to a business entity instead of the individual.

In one or more embodiments of the invention, the spending reduction plan generator (110) is configured to obtain the savings target (101). For example, the savings target (101) may be obtained from an entity (individual or business) that uses the spending reduction plan generator (110) to evaluate the likelihood of the entity to reach the target amount (102) within the target schedule (103). As discussed above, the target amount and the schedule may be related to a contemplated future purchase by the entity.

Figure 4:
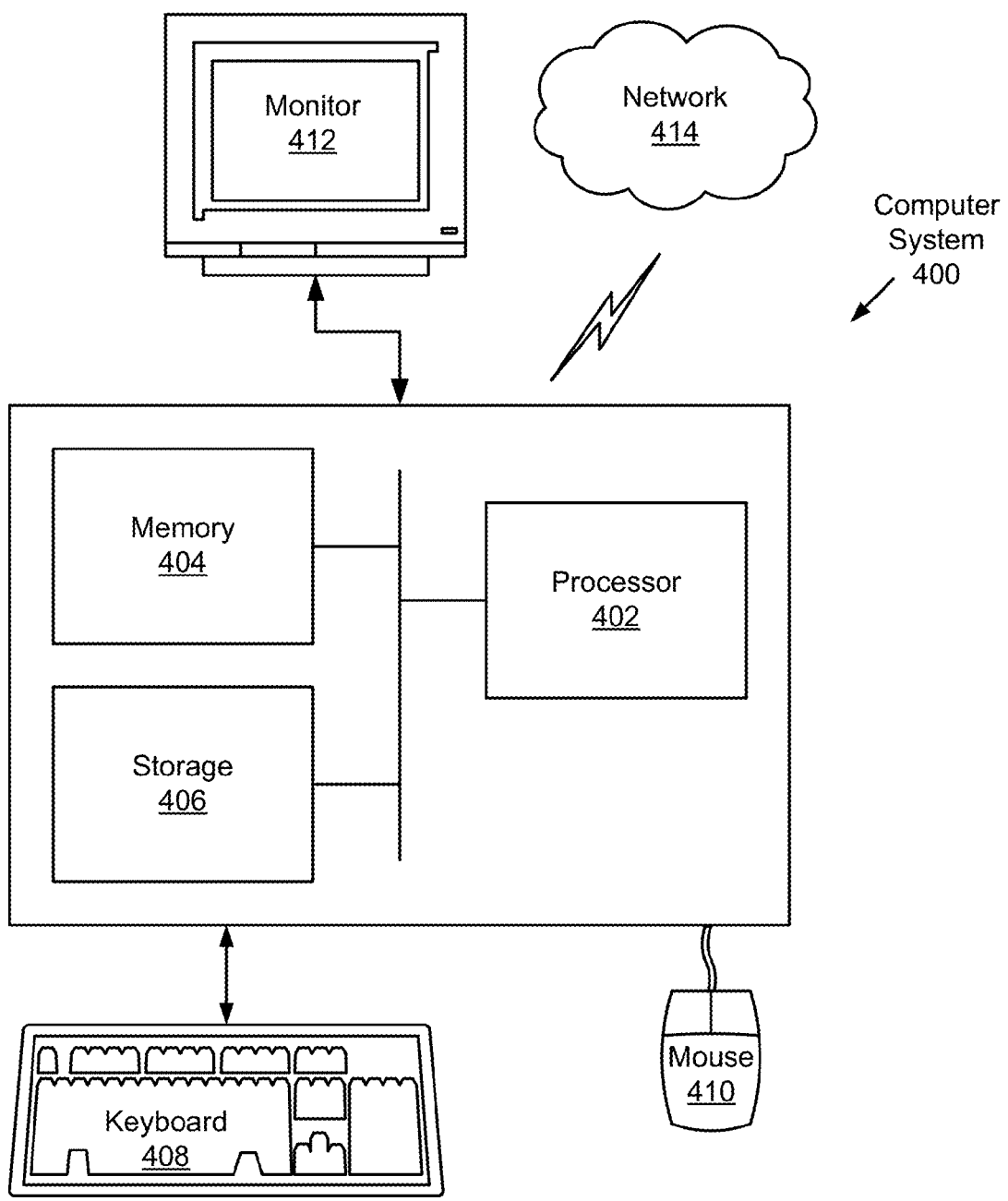
FIG. 4 depicts a computer system in accordance with one or more embodiments of the invention.

In one or mode embodiments of the invention, the spending reduction plan generator (110) may execute on a processor of a computer system (as shown in FIG. 4) and be configured to identify a spending category (134) as a target category from multiple spending categories in the spending history (130). For example, information contained in the spending history (130) may be categorized according to types of expenditures (e.g., dining, clothing, etc. for the individual or office expense, bonus expense, etc. for the business entity), amount of expenditures (e.g., over $1000, $500-$999, $100-499, $50-$99, $20-$49, etc.), frequency of expenditures (e.g., recurring daily, weekly, monthly, quarterly, annually, etc.), or other attributes/characteristics of expenditures. Among all the categories, certain categories may be tagged as discretionary, which means the expenditures may be postponed or eliminated (e.g., at least for a short term) without disrupting or serious effect on the individual's daily life or the business entity's normal operation. Examples of discretionary categories may include entertainment, home remodeling, preventive maintenance, advertising, etc. In one or more embodiments, the target category (134) may be identified by comparing corresponding spending variances (e.g., in the historical spending pattern (140)) based on a pre-determined criterion. For example, the individual's spending history may show larger variance in one spending category compared to another category. In one or more embodiments, the pre-determined criterion may designate the spending category (e.g., 134) with the largest variance within a recent time frame (e.g., a year) as the target category. One skilled in the art will appreciate that other criteria for identifying the target category based on the historical variances may also be used. The terms "target category", "spending category", and "category" may be used interchangeably throughout this document based on context.

In one or more embodiments of the invention, the spending reduction plan generator (110) executes on a processor of a computer system (as shown in FIG. 4) and is configured to generate the spending reduction plan (160) based on the savings target (101), the target category (134), a spending variance (142) corresponding to the target category (134), and a reduction percentage (not shown) corresponding to the target category (134).

As discussed above, the spending reduction plan generator (110) includes the spending pattern analyzer (111) and the savings pattern analyzer (112) in accordance with one or more embodiments of the invention. In one or more embodiments of the invention, the spending pattern analyzer (111) executes on a processor of a computer system (as shown in FIG. 4) and is configured to analyze the spending history (130) for multiple spending categories (e.g., associated with spending record (131), spending record (135), etc.) to generate the historical spending pattern (140) that includes spending variances corresponding to the spending categories. For example, multiple spending records in the spending category (134) may be analyzed on a periodic basis (e.g., weekly, monthly, quarterly, annually, etc.) to derive the variance (142) representing the consistency of spending (i.e., spending pattern) over a period (143) in the category (134).

In one or more embodiments of the invention, the savings pattern analyzer (112) executes on a processor of a computer system (as shown in FIG. 4) and is configured to analyze the historical savings pattern (150) for the target category (134) to determine the reduction percentage (not shown) corresponding to the target category (134). For example, a previous spending reduction plan (not shown) may have been generated by the spending reduction plan generator (110) and executed with certain level of success reflected in the entry (151) of the historical savings pattern (150) where planned reduction (152) represents a planned spending reduction in the target category (134) in the previous spending reduction plan and actual reduction (153) represents the actually achieved spending reduction in the spending category (134) in executing the previous spending reduction plan. In one or more embodiments of the invention, the savings pattern analyzer (112) is configured to determine the reduction percentage considering the success level (e.g., as reflected in the entry (151)) of executing the previous spending reduction plan for achieving the previous savings target. In one or more embodiments of the invention, the reduction percentage is the ratio of planned reduction in the target category (e.g., 134), to be formulated into the spending reduction plan (160), divided by the variance (142) associated with the target category (134) in the historical spending pattern (140). For example, if the actual reduction (153) is 50 percent of the planned reduction (152) in category (134) based on the entry (151) (e.g., associated with a previously executed spending reduction plan) of the historical savings pattern (150), the savings pattern analyzer (112) may determine the reduction percentage to be 50 percent for the target category (134). In other words, the periodic reduction (142) in the spending reduction plan (160) may be determined to be 50 percent of the variance (142) of the target category (134) in the historical spending pattern (140). One skilled in the art will appreciate that the reduction ratio for a target category, while determined in relation to historical information, may be higher or lower than the ratio of the actually achieved category reduction over the originally planned category reduction derived from the historical savings pattern.

In one or more embodiments of the invention, the spending plan generator (160) is further configured to obtain the historical savings pattern (150) from a community (170) where the spending reduction plan (160) is generated for a member of the community (170). The community (170) may include a group of individuals or business entities sharing information (e.g., ideas, experiences, discussion, etc.) regarding spending reductions. In such embodiments, the savings target (101), the spending history (130), and the historical spending pattern (140) may be related to a particular member of the community (170). In one or more embodiments, the historical savings pattern (150) may be obtained from the community (170) by the spending plan generator (160) using the savings pattern analyzer (112). In one or more embodiments, the membership of the community (170) may be based on open membership, paid membership, invitation only membership, etc.

As described above, the repository (120) may be configured to store the spending history (130), the historical spending pattern (140), the historical savings pattern (150), and the spending reduction plan (160).

In one or more embodiments of the invention, the spending history (130) includes multiple spending records (e.g., 131 and 135). For example, spending record (131) is shown to include an amount (132), a date (133), and a category (134) to which the spending is related. Although the spending record (131) is shown to be organized in a specific format, those skilled in the art will appreciate that a portion or all of the spending history (130) may be organized in various formats different than that depicted in FIG. 1. For example, various data structures such as table, file, database, linked list, hierarchical graph, etc. may be used for organizing the spending history (130).

In one or more embodiments of the invention, the historical spending pattern (140) includes multiple entries (e.g., 141 and 145). For example, the entry (141) is shown to include the variance (142), the period (143), and the category (134) to which the spending pattern is related. Although the entry (141) is shown to be organized in a specific format, those skilled in the art will appreciate that a portion or the entire historical spending pattern (140) may be organized in various formats different than that depicted in FIG. 1. For example, various data structures such as table, file, database, linked list, hierarchical graph, etc. may be used for organizing the historical spending pattern (140).

In one or more embodiments of the invention, the historical savings pattern (150) includes multiple entries (e.g., 151 and 155). For example, the entry (151) is shown to include the planned reduction (152), the actual reduction (153), and the category (134) to which the savings pattern is related. Although the entry (151) is shown to be organized in a specific format, those skilled in the art will appreciate that a portion or the entire historical savings pattern (150) may be organized in various formats different than that depicted in FIG. 1. For example, various data structures such as table, file, database, linked list, hierarchical graph, etc. may be used for organizing the historical savings pattern (150).

In one or more embodiments of the invention, portions or all of the spending history (130), the historical spending pattern (140), or the historical savings pattern (150) is managed or generated by an accounting or financial software of the individual or business entity. In such an embodiment, the spending reduction plan generator (110) may be a stand alone software, a built-in module, an optional add-on module, or a separate software suite component of the accounting or financial software. For example, the spending reduction plan generator (110) may exchange necessary data with the accounting or financial software using a pre-defined application programming interface.

In one or more embodiments of the invention, the spending reduction plan (160) includes multiple entries (e.g., 161 and 165). For example, the entry (161) is shown to include the periodic reduction (162), the estimate amount (163), and the target category (134) to which the spending reduction is related. In one or more embodiments of the invention, the periodic reduction (162) is an amount determined by multiplying the reduction percentage (e.g., determined using the savings pattern analyzer (112)) with the spending variance (142) corresponding to the target category (134). The estimated amount (163), representing estimated achievable cumulative savings, may be determined by multiplying the periodic reduction (162) with a number of periods in the target schedule (103). In this manner, the target amount (102) of the savings target (101) may be compared to this estimated achievable cumulative savings (i.e., the estimated amount (163)) in defining the spending reduction plan (160).

In one or more embodiments of the invention, the periodic reduction (162) is an amount determined by multiplying the reduction percentage (e.g., determined using the savings pattern analyzer (112)) with the spending variance (142) corresponding to the target category (134) while the estimated amount (163), representing estimated required periodic spending reduction, may be determined by dividing the target amount (102) of the savings target (101) by a number of periods in the target schedule (103) so that periodic reduction (162) of the spending reduction plan (160) may be compared to this estimated required periodic spending reduction (i.e., the estimated amount (163)) in defining the spending reduction plan (160).

Although the entry (161) is shown to be organized in a specific format, those skilled in the art will appreciate that a portion or the entire spending reduction plan (160) may be organized in various formats different than that depicted in FIG. 1. For example, various data structures such as table, file, database, linked list, hierarchical graph, etc. may be used for organizing the entry (161).

Figure 2:
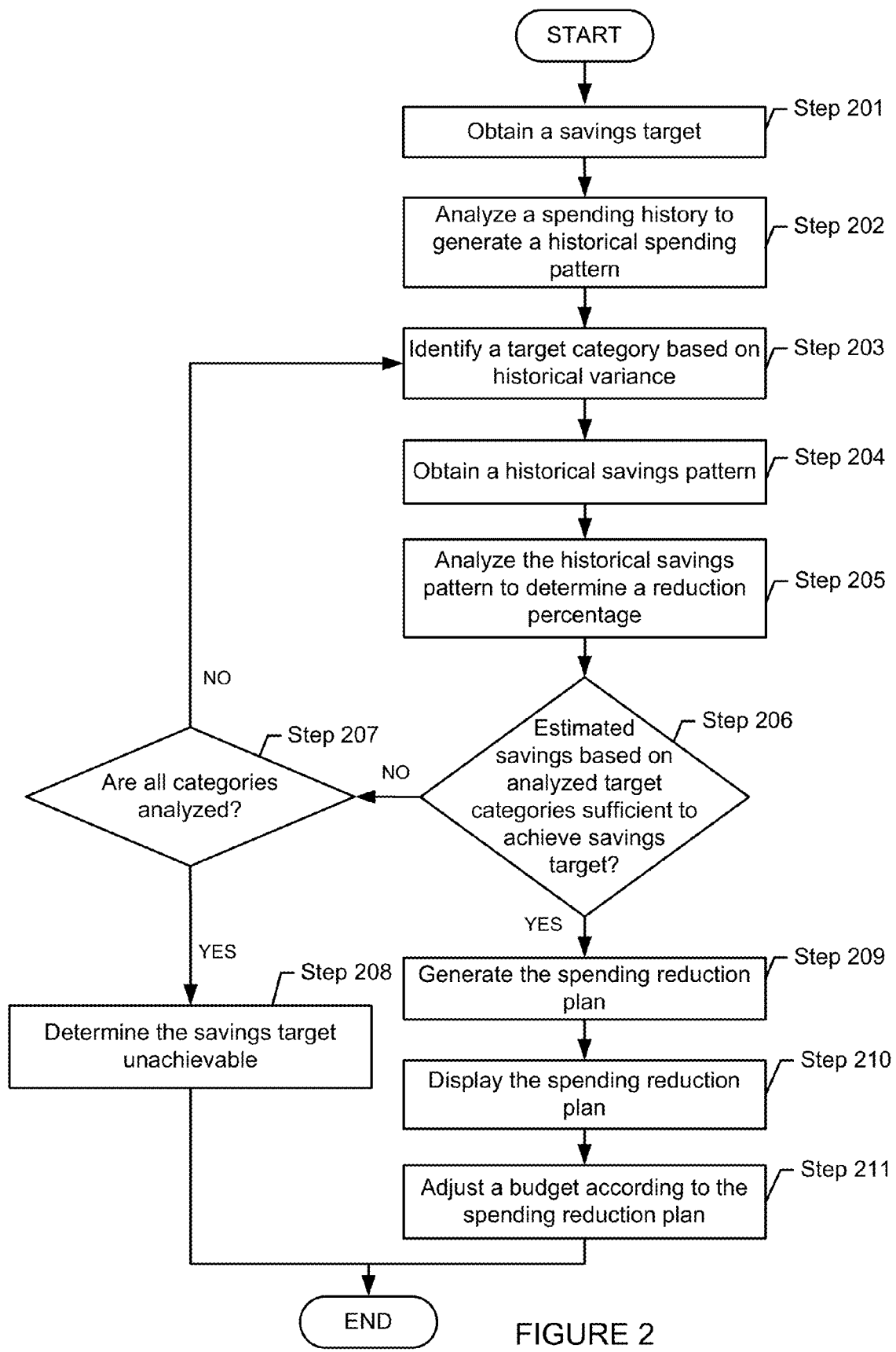
FIG. 2 depicts a flowchart of a method in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2.

In one or more embodiments of the invention, the method depicted in FIG. 2 may be practiced using system (100) described with respect to FIG. 1 above. In Step 201, a savings target may be obtained, for example, by the spending plan generator described with respect to FIG. 1 above. In one or more embodiments of the invention, the savings target includes a target amount and a target schedule. For example, the target amount may be related to the price of a contemplated future purchase or a planned expenditure while the target schedule may be related to a date on which the purchase or expenditure is planned to be consummated. Furthermore, the purchase or expenditure may be related to an individual or a business entity. In one or more embodiments of the invention, the savings target is associated with a commitment level. The commitment level relates to the level of individual's or business entity's interest or desire (e.g., high, medium, low, strong, weak, heavy, light, etc.) to save toward the savings target.

In Step 202, a spending history may be analyzed for multiple spending categories to generate a historical spending pattern that may include spending variances corresponding to the spending categories. For example, the spending history may include various records of prior expenditures managed in an accounting or financial software of the individual or business entity. In such case, the spending history may be analyzed using the spending pattern analyzer, described with respect to FIG. 1, that is configured with an interface to access the information managed by such accounting or financial software executing on a processor of a computer system.

In one or more embodiments of the invention, the spending history is categorized into various spending categories (e.g., dining, clothing, etc. for the individual or office expense, bonus expense, etc. for the business entity). For example, the various records of prior expenditures may be categorized in the accounting or financial software of the individual or the business entity. In other example, the spending history may be categorized by the spending pattern analyzer separately from such accounting or financial software that manages the raw historical information. In one or more embodiments, the spending category classification of the accounting or financial software that manages historical information may be summarized, expanded, substituted, or otherwise modified by the spending pattern analyzer in analyzing the spending history. In one or more embodiments, the spending pattern analyzer may classify spending category independent of other accounting or financial software.

In one or more embodiments of the invention, the amount of various prior expenditure records in each spending category is analyzed to calculate a variance corresponding to the spending category. The variance may be calculated using various statistical formulas (e.g., standard deviation, range of variation, etc.) representing a measure of variability or consistency of periodic spending in the spending category from one period to another. As described above, the calculated variances may be compiled into the historical spending pattern. In one or more embodiments, the variances of the spending categories may be calculated and the historical spending pattern compiled using the spending pattern analyzer described with respect to FIG. 1 above.

In Step 203, a target category may be identified by comparing the spending variances of various spending categories based on a pre-determined criterion. In one or more embodiments of the invention, the spending category with the largest variance of all spending categories in the historical spending pattern may be identified or selected as the target category. In one or more embodiments of the invention, the spending categories are screened (as eligible categories) based on an attribute before being subject to the selection process. For example, a portion of the spending categories may be tagged with the attribute of "non-discretionary spending" and therefore not included in the selection process. In one or more embodiments, identification of the target category may be performed using the spending reduction plan generator described with respect to FIG. 1 above.

In Step 204, a historical savings pattern may be obtained. In one or more embodiments of the invention, the historical savings pattern includes historical information relating to level of success in executing previously generated spending reduction plan for achieving prior savings target. For example, the historical savings pattern may be organized or manages as described with respect to FIG. 1 above. In some embodiments, the historical savings pattern may be related to the individual or business entity with which the savings target and the spending reduction plan are associated. In other embodiments, the historical savings pattern may be obtained from a community of which the individual or business entity is a member. For example, the community may have mechanisms for sharing historical spending pattern and historical savings pattern based on correlation between such historical patterns and characteristics of the community members so that shared information may be practical for applying to individual member's situation.

In Step 205, the historical savings pattern may be analyzed regarding the identified target category (e.g., with the largest variance in spending) to determine a reduction percentage. In one or more embodiments of the invention, the reduction percentage is determined considering the historical ratio of actual spending reduction over the planned spending reduction experienced in the target category. Specifically, the higher the historical ratio, the more probable that similar spending reduction may be achievable for the spending reduction plan being formulated. For example, the reduction ratio may be determined by multiplying the historical ratio by a pre-determined factor. Other formulas may also be used in determining the reduction ratio based on the historical ratio.

Steps 203 through 205 may be performed repeatedly to identify multiple target categories, for example associated with highest variances among the eligible spending categories analyzed. In Step 206, a determination is made as to whether the savings estimated based on the target categories analyzed so far is sufficient to achieve the savings target. Details of estimating the savings are described later. If the estimated savings is determined to be insufficient to achieve the savings target, the method proceeds to Step 207 where a determination is made as to whether all spending categories have been analyzed through the iterations of Steps 203 through 205. If the answer is yes, then the savings target is determined to be unachievable in Step 208 and the method ends. If the answer is no, then the method returns to Step 203 for one more iteration to identify another target category (e.g., associated with the next highest variance compared to the previous iterations).

Returning to Step 206, if the determination is made that the estimated savings based on all spending categories analyzed so far is sufficient to achieve the savings target, and then a spending reduction plan may be generated according to a pre-determined algorithm, for example based on the savings target and the identified target spending categories with corresponding spending variances and corresponding reduction percentages (Step 209). In one or more embodiments of the invention, the pre-determined algorithm includes determining a periodic reduction amount for each identified target categories based on the corresponding reduction percentage and the corresponding spending variance (e.g., as a product of the reduction percentage and the spending variance). Accordingly, the periodic reduction amounts for all identified target categories may be summed to generate a periodic amount of the spending reduction plan. In one or more embodiments, the periodic amount for the spending plan may be modified based on the commitment level of the savings target. For example, the periodic amount may be modified by multiplying it with the commitment level, which may be represented as a percentage value with higher percentages representing stronger commitments.

In one or more embodiments of the invention, the pre-determined algorithm accumulates the periodic amount for the spending plan over a time period covered by the target schedule to generate an estimated amount (i.e., the estimated savings amount). Accordingly, the estimated amount may be compared to the target amount of the savings target to confirm that the spending reduction plan is indeed sufficient to achieve the savings target.

In one or more embodiments of the invention, based on the savings target, the pre-determined algorithm divides the target amount by a number of periods in the target schedule to generate an estimated amount (i.e., the estimated required periodic reduction amount). Accordingly, the estimated amount may be compared to the periodic amount of the spending reduction plan to confirm that the spending reduction plan is indeed sufficient to achieve the savings target.

In Step 210, the spending reduction plan may be displayed, for example to the individual or the business entity for review and acceptance. Once accepted, the individual or the business entity may adjust a budget according to the spending reduction plan (Step 211).

Figure 3:
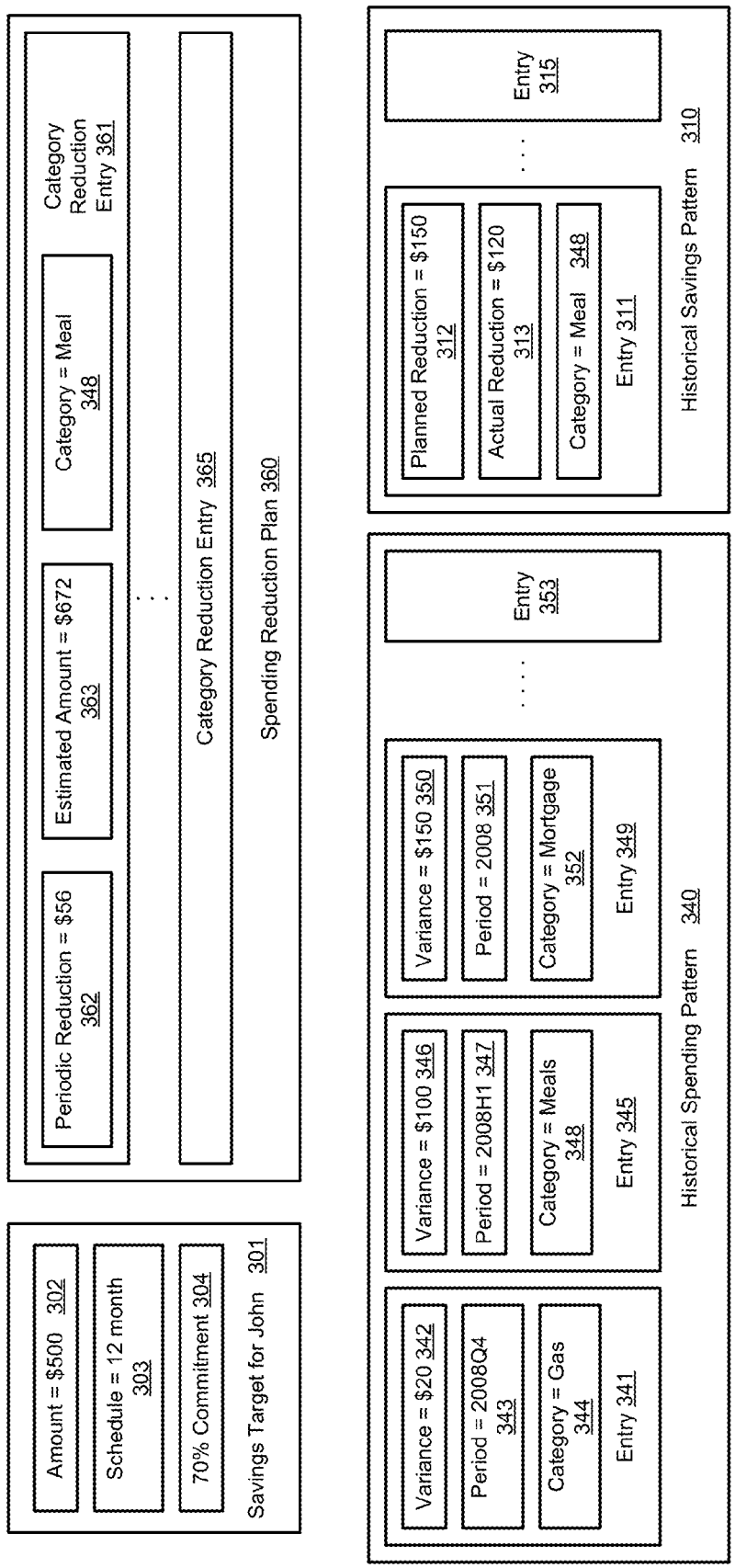
FIG. 3 depicts a diagram in accordance with one or more embodiments of the invention.

FIG. 3 depicts a diagram showing an example use case of the invention in accordance with one or more embodiments of the invention. As shown in FIG. 3, a savings target (301) is established for an individual, John, who plans to purchase a new dining table for $500 (302) in a year (303). John indicates a 70 percent commitment (304) to achieve this savings target (301). Using the spending reduction plan generator described above, historical spending patterns (340) is obtained from a personal financial software used by John that shows several entries (341, 345, 349, 353) indicating a categorized spending pattern. For example, the entry (341) includes how much (not shown) John spent in the gas category (341) over fourth quarter period (343) in year 2008 with a month to month variance (342) of $20. The entry (345) includes how much John spent in the meals category (348) over the period (347) spanning the first half in year 2008 with a month to month variance (346) of $100. The entry (349) includes how much John paid in the variable interest mortgage payments category (349) for the period (351) spanning the year 2008 with a month to month variance (349) of $150.

Although the entry (349) shows the highest variance of $150, the mortgage payment is recognized by the spending reduction plan generator as non-discretional spending and not eligible as a target category for reducing spending. Therefore, the entry (345) is identified as the target category with next highest variance of $100 indicating possibility of reducing spending in the order of such amount. In comparison, the month to month variance (342) of $20 in gas spending category (344) is not chosen because John's spending in gas is mostly for commuting to work and is fairly consistent.

With the target category (348) (corresponding to meals) identified, there is an opportunity in reducing the spending in meals (e.g., dining out) by up to $1200 over one year (i.e., the product of monthly variance $100 and 12 month in time over the savings target schedule (303)).

Furthermore, John's track record in achieving previous savings targets is evaluated as a reference in the likelihood of being able to achieve this particular target of saving for a dining table. In the historical savings pattern (310) tracked by the spending reduction plan generator, entry (311) includes information regarding such a previous effort in executing a spending reduction plan with a planned monthly reduction in spending of $150 in the same category (348) of meals. As shown in the entry (311), John achieved actual reduction on average at $120 per month in the previous effort. Based on this 80% (i.e., $120/$150) realization factor, the spending reduction plan generator determines $80 (i.e., the product of the monthly variance $100 and the historical realization factor 80%) as a reasonable amount for John to reduce in his monthly spending in meals. However, since John also indicates that he is 70% committed to save for purchasing the dining table, the final monthly reduction (i.e., the periodic reduction) is further modified (or reduced) by this commitment level and set at $56 (i.e., $80 times 70%). Accordingly, the spending reduction plan (360) is established as a single category plan for reducing monthly spending in meals by $56 per month (362) for a period of one year to achieve an estimated savings amount $672 (363), which is sufficient to achieve the savings target amount of $500 (302). Although only one target category (361) is identified to be included in the spending reduction plan in the example above, in other example, the spending reduction plan (360) may include a combination of one or more additional target categories in various amounts.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a first spending reduction amount, comprising:
   obtaining, from a member of a community, a savings target comprising a target amount and a target schedule;
   identifying, using a processor of a computer system, a spending history of the member comprising a plurality of spending categories;
   calculating a plurality of spending variances corresponding to the plurality of spending categories, wherein each of the plurality of spending variances represents a consistency of periodic spending in a corresponding spending category of the plurality of spending categories;
   identifying a first spending variance that is the largest of the plurality of spending variances; and
   generating, for the member of the community, the first spending reduction amount for a first spending category of the plurality of spending categories corresponding to the first spending variance and based on the savings target.

2. The method of claim 1, further comprising:
   reducing a budget by the spending reduction amount.

3. The method of claim 1, further comprising:
   identifying a second spending variance that is the second largest of the plurality of spending variances; and
   generating, for the member of the community, a second spending reduction amount for a second spending category of the plurality of spending categories corresponding to the second spending variance.

4. The method of claim 1, wherein generating the first spending reduction amount comprises:
   determining a periodic reduction amount based on the first spending variance corresponding to the first spending category;
   determining an estimated amount by accumulating the periodic reduction amount according to the target schedule; and
   comparing the target amount to the estimated amount.

5. The method of claim 4,
   wherein determining the estimated amount is performed by multiplying the periodic reduction amount with a number of periods in the target schedule.

6. The method of claim 1, wherein generating the spending reduction amount comprises:
   determining a periodic reduction amount based on the first spending variance corresponding to the first spending category;
   determining an estimated amount based on the target amount and the target schedule; and
   comparing the periodic reduction amount to the estimated amount.

7. A computer readable medium storing instructions for executing on a processor to generate a first spending reduction amount, the instructions comprising functionality for:
   obtaining, from a member of a community, a savings target comprising a target amount and a target schedule;
   identifying a spending history of the member comprising a plurality of spending categories;
   calculating a plurality of spending variances corresponding to the plurality of spending categories, wherein each of the plurality of spending variances represents a consistency of periodic spending in a corresponding spending category of the plurality of spending categories;
   identifying a first spending variance that is the largest of the plurality of spending variances; and
   generating, for the member of the community, the first spending reduction amount for a first spending category of the plurality of spending categories corresponding to the first spending variance and based on the savings target.

8. The computer readable medium of claim 7, wherein the instructions further comprise functionality for reducing a budget by the spending reduction amount.

9. The computer readable medium of claim 7, wherein the instructions further comprise functionality for:
   identifying a second spending variance that is the second largest of the plurality of spending variances; and
   generating, for the member of the community, a second spending reduction amount for a second spending category of the plurality of spending categories corresponding to the second spending variance.

10. The computer readable medium of claim 7, wherein the instructions further comprise functionality for generating the spending reduction amount by:
    determining a periodic reduction amount based on the first spending variance corresponding to the first spending category;
    determining an estimated amount by accumulating the periodic reduction amount according to the target schedule; and
    comparing the target amount to the estimated amount.

11. The computer readable medium of claim 10,
    wherein determining the estimated amount is performed by multiplying the periodic reduction amount with a number of periods in the target schedule.

12. The computer readable medium of claim 7, wherein the instructions further comprise functionality for generating the spending reduction amount by:
    determining a periodic reduction amount based on the first spending variance corresponding to the first spending category;
    determining an estimated amount based on the target amount and the target schedule; and
    comparing the periodic reduction amount to the estimated amount.

13. A system for generating a spending reduction amount, comprising:
    a spending reduction plan generator executing on a processor and configured for:
      obtaining, from a member of a community, a savings target comprising a target amount and a target schedule;
      generating, for the member of a community, the spending reduction amount for a first spending category of a plurality of spending categories corresponding to a first spending variance and based on the savings target
    wherein the spending reduction plan generator comprises:
      a spending pattern analyzer executing on the processor and configured for:
        identifying a spending history of the member comprising the plurality of spending categories, and
        calculating a plurality of spending variances corresponding to the plurality of spending categories, wherein each of the plurality of spending variances represents a consistency of periodic spending in a corresponding spending category of the plurality of spending categories; and
    a repository operatively connected to the spending reduction plan generator and configured for storing:
      the savings target;

the spending history comprising a plurality of spending record each comprising an amount, date, and category of the spending record;

the spending reduction amount comprising one or more entries each comprising a periodic reduction amount, estimated amount, and a category of the spending reduction plan entry.

* * * * *